US012225000B2

(12) United States Patent
Liao et al.

(10) Patent No.: US 12,225,000 B2
(45) Date of Patent: Feb. 11, 2025

(54) SERVER FOR ISSUING A DIGITAL CERTIFICATE AND DEVICE FOR VERIFYING AUTHENTICATION

(71) Applicant: Huawei Technologies Duesseldorf GmbH, Duesseldorf (DE)

(72) Inventors: Lijun Liao, Darmstadt (DE); Yong Li, Darmstadt (DE); Li Duan, Darmstadt (DE); Qing Han, Beijing (CN)

(73) Assignee: Huawei Technologies Duesseldorf GmbH, Duesseldorf (DE)

( * ) Notice: Subject to any disclaimer, the term of this patent is extended or adjusted under 35 U.S.C. 154(b) by 307 days.

(21) Appl. No.: 17/837,941

(22) Filed: Jun. 10, 2022

(65) Prior Publication Data

US 2022/0303265 A1 Sep. 22, 2022

Related U.S. Application Data

(63) Continuation of application No. PCT/EP2019/084904, filed on Dec. 12, 2019.

(51) Int. Cl.
*H04L 29/06* (2006.01)
*H04L 9/40* (2022.01)

(52) U.S. Cl.
CPC ............... *H04L 63/0823* (2013.01)

(58) Field of Classification Search
CPC ................................ H04L 63/0823
See application file for complete search history.

(56) References Cited

U.S. PATENT DOCUMENTS

| 10,454,689 | B1* | 10/2019 | Sharifi Mehr | ........ H04L 63/166 |
| 2007/0150723 | A1* | 6/2007 | Estable | ........ H04W 12/06 |
| | | | | 713/155 |
| 2011/0119485 | A1* | 5/2011 | Killian | ........ H04L 63/08 |
| | | | | 713/156 |

(Continued)

OTHER PUBLICATIONS

Duan et al., "Non-interactive Certificate Update Protocol for Efficient Authentication in IoT," IoT 2019: Proceedings of the 9th International Conference on the Internet of Things, Bilbao, Spain, XP058442877, Total 8 pages, DOI: 10.1145/3365871.3365879, ACM, New York, NY, USA (Oct. 22-25, 2019).

(Continued)

*Primary Examiner* — Shawnchoy Rahman
(74) *Attorney, Agent, or Firm* — Leydig, Voit & Mayer, Ltd.

(57) ABSTRACT

A Certification Authority (CA) server for issuing digital certificates generates a first digital certificate associated with a first public key of the device and calculates an update factor for the first private key. Based on the first public key, the calculated update factor, and a predefined public system parameter, the CA server calculates a second public key for a determined time period for the device. The CA server generates a second digital certificate valid at the determined time period and associated with the second public key and sends the second digital certificate to the device. A device may calculate an update factor for a stored first private key, calculates a second private key based on the calculated update factor and the first private key, receives from the CA server a second digital certificate associated with a second public key, and validates the device based on the second digital certificate.

14 Claims, 6 Drawing Sheets

(56) References Cited

U.S. PATENT DOCUMENTS

2013/0268758 A1* 10/2013 Schrecker ........... H04W 12/069
                                                    713/168
2013/0268766 A1* 10/2013 Schrecker ............... G06F 21/34
                                                    713/185
2017/0061437 A1*  3/2017 Peng .................. G06Q 20/4014

OTHER PUBLICATIONS

Simplicio Jr. et al., "The Unified Butterfly Effect: Efficient Security Credential Management System for Vehicular Communications," 2018 IEEE Vehicular Networking Conference (VNC), XP033510036, Total 8 pages, DOI: 10.1109/ VNC.2018.8628369, Institute of Electrical and Electronics Engineers, New York, New York (Dec. 5-7, 2018).

* cited by examiner

SERVER FOR ISSUING A DIGITAL CERTIFICATE AND DEVICE FOR VERIFYING AUTHENTICATION

CROSS-REFERENCE TO RELATED APPLICATIONS

This application is a continuation of International Application No. PCT/EP2019/084904, filed on Dec. 12, 2019, the disclosure of which is hereby incorporated by reference in its entirety.

TECHNICAL FIELD

The present disclosure relates generally to the field of digital certificates and authentication. In particular, issuing digital certificates and authentication via Public Key Infrastructure (PKI). The disclosure presents a certification authority server and a corresponding method for issuing a digital certificate. The disclosure also presents a device (such as a client device) and a corresponding method for verifying an authentication of the client device.

BACKGROUND

Conventionally, nodes in the Internet of Things (IoT) rely on Public Key Infrastructure (PKI) for authentication. However, one of the challenges that a certification authority in IoT faces, is the huge number of certificates to issue, and certificate status to maintain. Furthermore, if certificates are updated periodically over a short time, for example, in order to improve the security, the problem may become more challenging as there are constant waves of rush certificate requests for the CA to verify online. On the other hand, to preserve the lifetime of IoT nodes with increased certificate update frequency, it is necessary to reduce the communication in the certificate update protocols.

Conventional devices and methods are known, which use more hardware for dealing with the large amount of certificate request. This results in high cost and not elastic IoT systems.

SUMMARY

In view of the above-mentioned problems and disadvantages, the embodiments of the disclosure aim to improve the conventional devices and methods.

An objective is to provide a Non-interactive Certificate Update protocol (NICU).

Embodiments of the disclosure relate to a CA server that can update the public key in certificates via the NICU and without interacting with client devices. Moreover, when receiving a new certificate, the (client) device should be able to calculate its private signing key by itself, and accordingly to preserve the correctness of authentication.

An objective is achieved by the solution provided in the enclosed independent claims. Advantageous implementations are further defined in the dependent claims.

The main advantages of the embodiments of the disclosure can be summarized as follows:
Improving the performance of certificate update process.
Reducing the communication costs for processing with CA server for the new certificates.
No Certificate Revocation List (CRL) and/or Online Certificate Status Protocol (OCSP) is required, e.g., if the update period is set short enough.
Providing a (new) non-interactive certificate update for large number of IoT certificates.

A first aspect of the disclosure provides a Certification Authority (CA) server for issuing a digital certificate, the CA server being configured to generate a first digital certificate for a device, wherein the first digital certificate is associated with a first public key of the device, calculate an update factor for a first private key of the device, calculate a second public key for a determined time period for the device, based on the first public key, the calculated update factor and a predefined public system parameter, and generate a second digital certificate valid at the determined time period and associated with the second public key and send the second digital certificate to the device.

The predefined public system parameter may indicate a point of an elliptic curve cryptography.

The CA server may be, or may be incorporated in, for example, an IoT server. The device may be, or may be incorporated in, for example, an IoT device, a client device, etc.

In particular, the public key of the device (e.g., IoT device) may be calculated and updated by using the mathematical features of elliptic curve discrete logarithm problem (ECDLP), which may (largely) reduce the interaction between the device (e.g., client device) and the key update process. For example, in some embodiments, no message exchange is needed (e.g., when NICU1 protocol is used that is discussed in more detailed in the following sections). In some embodiments, (only) one message may be needed (e.g., when NICU2 protocol is used that is discussed in more detailed in the following sections).

The CA server generates the first digital certificate for the device. For example, the CA server may obtain (e.g., receive) from the device, e.g., the first public key, a first identifier (ID), etc., and may generate the first digital certificate for the device and may further send the first digital certificate to the device.

The CA server further calculates the update factor for the first private key. In particular, the update factor may be calculated based on a random number, etc.

The CA server further calculates the second public key (e.g., a new updated public key) for the determined time period for the device. The determined time period may be a specific time, a specific time period, a date, etc., that the calculated second public key is valid at that determined time period. Moreover, it may be calculated based on the first public key, the calculated update factor and the predefined public system parameter. The predefined public system parameter may be or may indicate a point of an elliptic curve cryptography.

The CA server further calculates the second digital certificate which may be, for example, a new update certificate for the device.

The CA server may comprise a circuitry. The circuitry may comprise hardware and software. The hardware may comprise analog or digital circuitry, or both analog and digital circuitry. In some embodiments, the circuitry comprises one or more processors and a non-volatile memory connected to the one or more processors. The non-volatile memory may carry executable program code which, when executed by the one or more processors, causes the device to perform the operations or methods described herein.

The CA server is thus able to update the public key in certificates via a NICU and without interacting with client devices.

In an implementation form of the first aspect, the CA server is further configured to receive, from the device, via a secure communication channel, one or more of:
an identifier (ID) of the device,
the first public key of the device,
a first Pseudo Random Function (PRF) key,
an encryption key of the device.

In a further implementation form of the first aspect, the CA server is further configured to calculate a second PRF key and calculate the update factor, based on calling a PRF on the first PRF key.

In a further implementation form of the first aspect, the update factor is calculated based on a random number, and wherein the CA server is further configured to generate a cipher-text by encrypting the calculated update factor with the encryption key of the device, and send the cipher-text to the device.

In a further implementation form of the first aspect, the second public key is calculated based on multiplying the update factor by the predefined public system parameter indicating a point of an elliptic curve cryptography, and adding the product of the multiplication to the first public key.

In a further implementation form of the first aspect, the CA server is configured for authentication via PKI with public key cryptography.

A second aspect of the disclosure provides a method for a Certification Authority (CA) server for issuing a digital certificate, the method comprising: generating a first digital certificate for a device, wherein the first digital certificate is associated with a first public key of the device, calculating an update factor for a first private key of the device, calculating a second public key for a determined time period for the device, based on the first public key, the calculated update factor and a predefined public system parameter, and generating a second digital certificate valid at the determined time period and associated with the second public key and sending the second digital certificate to the device.

In an implementation form of the second aspect, the method further comprises receiving, from the device, via a secure communication channel, one or more of:
an identifier of the device,
the first public key of the device,
a first Pseudo Random Function key,
an encryption key of the device.

In a further implementation form of the second aspect, the method further comprises calculating a second PRF key and calculate the update factor, based on calling a PRF on the first PRF key.

In a further implementation form of the second aspect, the update factor is calculated based on a random number, and wherein the method further comprises generating a cipher-text by encrypting the calculated update factor with the encryption key of the device, and sending the cipher-text to the device.

In a further implementation form of the second aspect, the second public key is calculated based on multiplying the update factor by the predefined public system parameter indicating a point of an elliptic curve cryptography, and adding the product of the multiplication to the first public key.

In a further implementation form of the second aspect, the method is for authentication via Public Key Infrastructure with public key cryptography.

The method of the second aspect and its implementation forms achieve the same advantages and effects as the CA server of the first aspect.

A third aspect of the disclosure provides a device being configured to store a pair of a first public key and a first private key, store a first digital certificate issued by a Certification Authority (CA) server, wherein the first digital certificate is associated with the first public key, calculate an update factor for the first private key, calculate a second private key, based on the calculated update factor and the first private key, receive a second digital certificate from the CA server, wherein the second digital certificate is associated with a second public key, and verify an authentication of the device based on the second digital certificate using the second public key and the second private key.

The device of the third aspect may be, or may be incorporated in, for example, an IoT device, a client device, etc. The CA server may be, or may be incorporated in, for example, an IoT server.

The device may, for example, receive the first digital certificate from the CA server. The first digital certificate may be issued by the CA server and for the first public key of the device.

The device further calculates the update factor for the first private key and calculates the second private key. The second private key may be anew updated private key. The device further calculates the second public key which may be a new updated public key for the device.

The device is thus able, when receiving a new certificate, to calculate its private signing key by itself, and accordingly to preserve the correctness of authentication.

In an implementation form of the third aspect, the device is further configured to send, to the CA server, via a secure communication channel, one or more of
an ID of the device,
the first public key of the device,
a first PRF key,
an encryption key of the device.

In a further implementation form of the third aspect, the device is further configured to calculate a second PRF key and calculate the update factor, based on calling a PRF on the first PRF key.

In a further implementation form of the third aspect, the device is further configured to receive, from the CA server, a cipher-text, and calculate the update factor by decrypting the cipher-text with a decryption key of the device.

In a further implementation form of the third aspect, the second private key is calculated based on adding the calculated update factor to the first private key.

In a further implementation form of the third aspect, the device is a node in Internet of Things (IoT).

A fourth aspect of the disclosure provides a method comprising storing a pair of a first public key and a first private key, storing a first digital certificate issued by a Certification Authority (CA) server, wherein the first digital certificate is associated with the first public key, calculating an update factor for the first private key, calculating a second private key, based on the calculated update factor and the first private key, receiving a second digital certificate valid for a determined time period from the CA server, wherein the second digital certificate is associated with a second public key, and verifying an authentication of the device at the determined time period, based on the second digital certificate using the second public key and the second private key.

In an implementation form of the fourth aspect, the method further comprises sending, to the CA server, via a secure communication channel, one or more of
an identifier of the device,
the first public key of the device, a first Pseudo Random Function key,
an encryption key of the device.

In a further implementation form of the fourth aspect, the method further comprises calculating a second PRF key and calculate the update factor, based on calling a PRF on the first PRF key.

In a further implementation form of the fourth aspect, the method further comprises receiving, from the CA server, a cipher-text, and calculating the update factor by decrypting the cipher-text with a decryption key of the device.

In a further implementation form of the fourth aspect, the second private key is calculated based on adding the calculated update factor to the first private key.

In a further implementation form of the fourth aspect, the method is for a node in Internet of Things.

The method of the fourth aspect and its implementation forms achieve the same advantages and effects as the device of the third aspect.

A computer program product including program code which, when executed by a computer, causes the method of second aspect (and/or one of the implementation form of the second aspect) and/or the method of fourth aspect (and/or one of the implementation form of the fourth aspect) to be performed.

In some embodiments, the computer program can be provided on a non-transitory computer-readable recording medium.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings, in which.

DETAILED DESCRIPTION OF EMBODIMENTS

Figure 1:
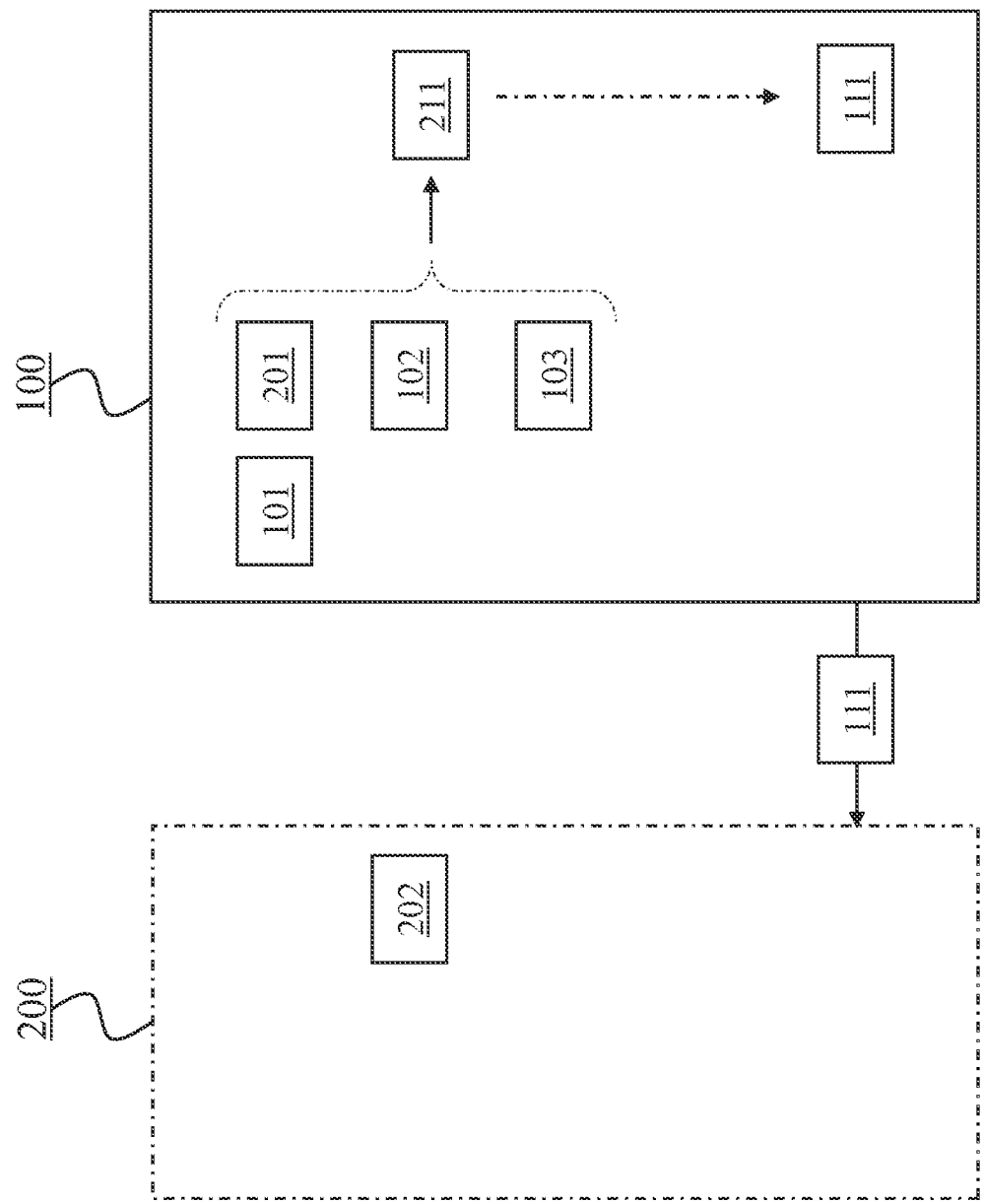
FIG. 1 is a schematic view of a CA server for issuing a digital certificate, according to an embodiment of the present disclosure.

FIG. 1 is a schematic view of a CA server 100 for issuing a digital certificate 101, 111, according to an embodiment of the present disclosure.

The CA server 100 is configured to generate a first digital certificate 101 for a device 200, wherein the first digital certificate 101 is associated with a first public key of the device 201.

The CA server 100 is further configured to calculate an update factor 102 for a first private key 202 of the device 200.

The CA server 100 is further configured to calculate a second public key 211 for a determined time period for the device 200, based on the first public key 201, the calculated update factor 102 and a predefined public system parameter 103.

The CA server 100 is further configured to generate a second digital certificate 111 valid at the determined time period and associated with the second public key 211 and send the second digital certificate 111 to the device 200.

The CA server may comprise a circuitry. The circuitry may comprise hardware and software. The hardware may comprise analog or digital circuitry, or both analog and digital circuitry. In some embodiments, the circuitry comprises one or more processors and a non-volatile memory connected to the one or more processors. The non-volatile memory may carry executable program code which, when executed by the one or more processors, causes the device to perform the operations or methods described herein.

Figure 2:
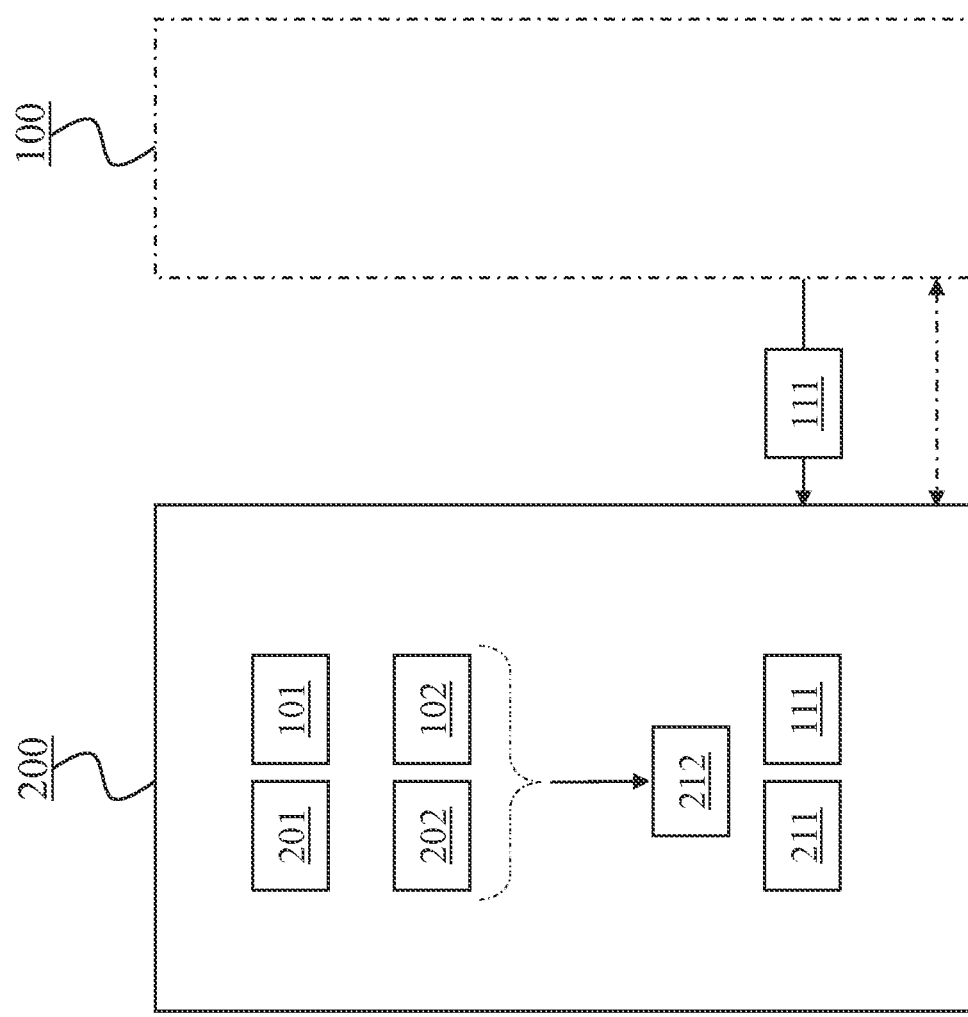
FIG. 2 is a schematic view of a device for verifying its authentication, according to an embodiment of the present disclosure.

Reference is now made to FIG. 2, which is a schematic view of a device 200 for verifying its authentication, according to an embodiment of the present disclosure.

The device 200 is configured to store a pair of a first public key 201 and a first private key 202.

The device 200 is further configured store a first digital certificate 101 issued by a Certification Authority server 100, wherein the first digital certificate 101 is associated with the first public key 201.

The device 200 is further configured calculate an update factor 102 for the first private key 202.

The device 200 is further configured calculate a second private key 212, based on the calculated update factor 102 and the first private key 202.

The device 200 is further configured receive a second digital certificate 111 from the CA server 100, wherein the second digital certificate 111 is associated with a second public key 211.

The device 200 is further configured verify an authentication of the device 200 based on the second digital certificate 111 using the second public key 211 and the second private key 212.

The device 200 may comprise a circuitry. The circuitry may comprise hardware and software. The hardware may comprise analog or digital circuitry, or both analog and digital circuitry. In some embodiments, the circuitry comprises one or more processors and a non-volatile memory connected to the one or more processors. The non-volatile memory may carry executable program code which, when executed by the one or more processors, causes the device to perform the operations or methods described herein.

Figure 3:
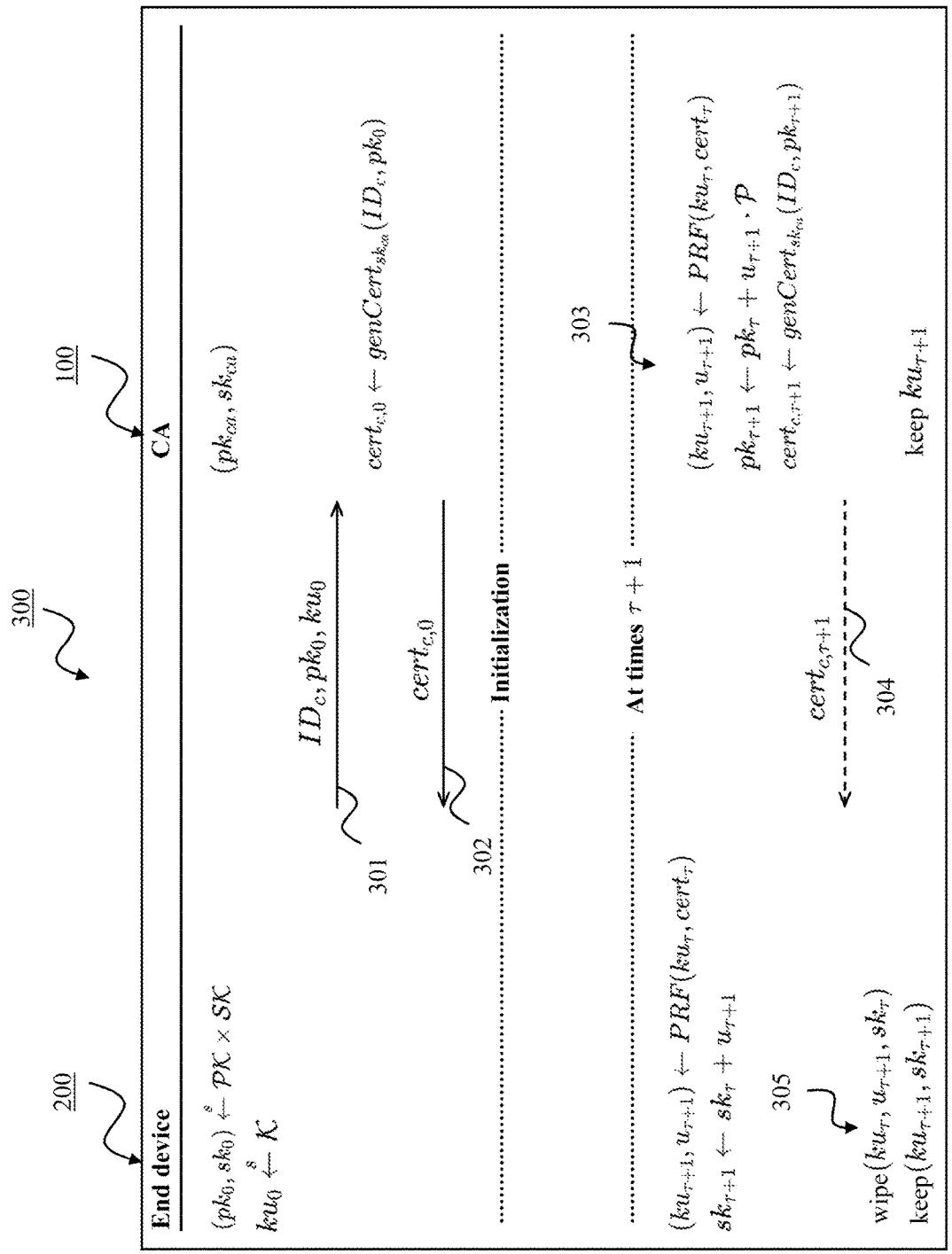
FIG. 3 is a schematic view of a diagram illustrating non-interactive certificate update protocol based on the PRF key.

Reference is now made to FIG. 3, which is a schematic view of a diagram 300 illustrating non-interactive certificate update (NICU1) protocol based on the PRF key.

According to the NICU1 protocol, for the certificate update at time T+1, the device 200 and the CA server 100 can carry out the update independently, given the certificate (cert$_T$) and the PRF key (ku$_T$) used previously at T.

At step 301, the CA server 100 receives from the device 200 (End device), for example, an identifier of the device 200, a public key of the device 200 (e.g., the first public key) and a PRF key.

At step 302, the CA server 100 generates and sends the first digital certificate 101 to the device 200.

Moreover, the CA server 100 and/or the device 200 may initiate updating the first digital certificate.

For example, at step 303, at a determined time (T+1), the following operations may be performed.

The CA server 100 calculates the second PRF key and the update factor 102 for the first private key 202. For example, a new PRF key (ku$_{T+1}$) and the update factor (u$_{T+1}$) are derived from the first (old) PRF key (ku$_T$) via calling PRF(ku$_T$, cert$_T$).

At CA server 100, the second public key (new public key pk$_{T+1}$) 211 is calculated based on multiplying the update factor (u$_{T+1}$) 102 by the predefined public system parameter (P) 103 indicating a point of an elliptic curve cryptography, and adding the product of the multiplication (u$_{T+1}$*P) to the first public key (pk$_T$) 201.

At CA server 100, the second digital certificate 111 may be generated.

At device 200 (IoT device), the second private key (sk$_{T+1}$) 212 is calculated based on adding the calculated update factor (u$_T$) 102 to the first private key (sk$_T$) 202 and modulo the group order. Then, the second public key (new public key pk$_{T+1}$) 211 is calculated based on multiplying the update factor (u$_{T+1}$) 102 by the predefined public system parameter (P) 103 indicating a point of an elliptic curve cryptography, and adding the product of the multiplication (u$_{T+1}$*P) to the first public key (pk$_T$) 201.

At step 304, the CA server 100 sends the second digital certificate 111 to the device 200.

At step 305, the device 200 wipes the first PRF key, the first private key 202, the (old) update factor, etc. Moreover, the device 200 keeps the second private key 212, the (new) update factor 102, etc.

Figure 4:
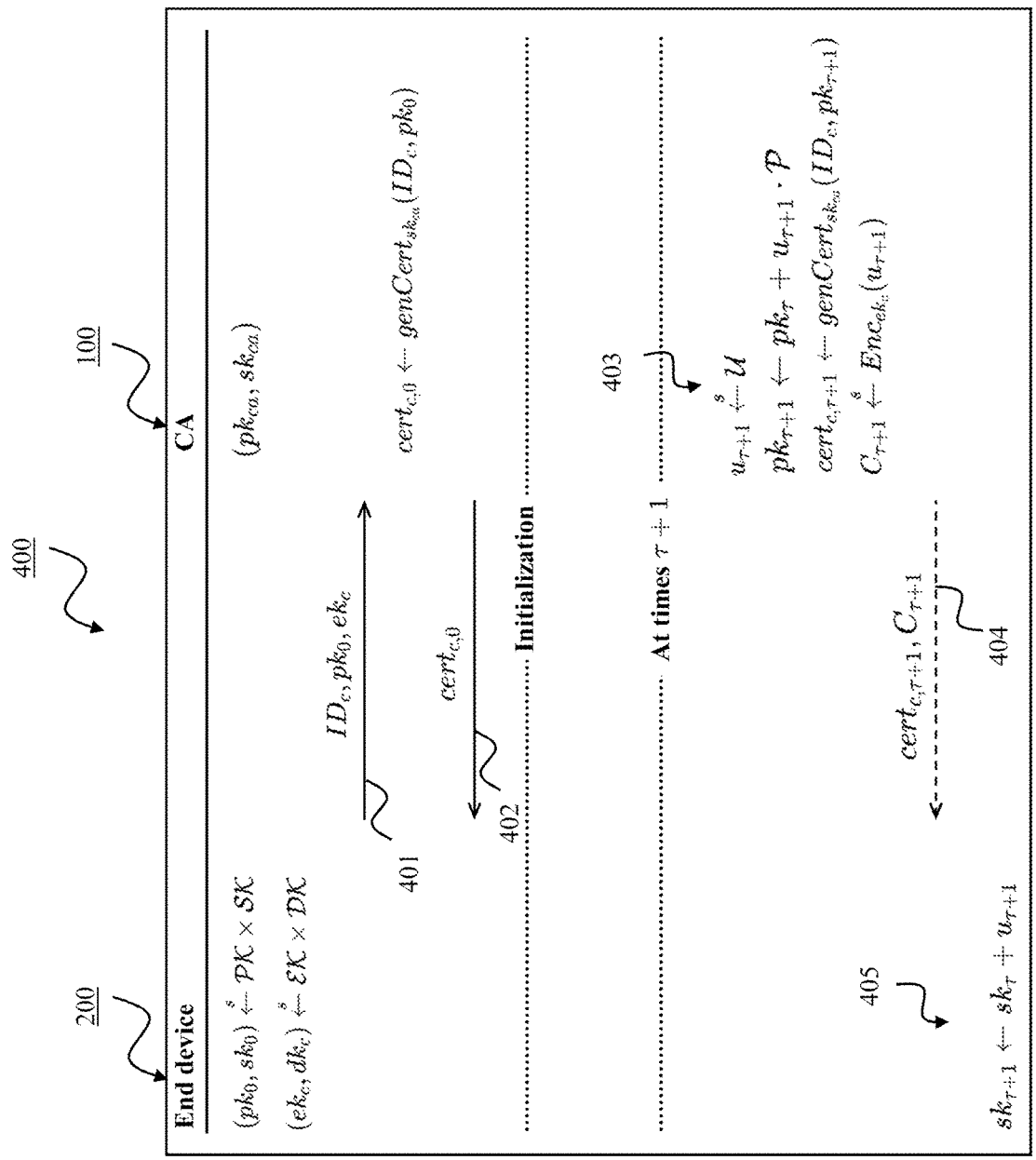
FIG. 4 is a schematic view of a diagram illustrating non-interactive certificate update protocol based on public key encryption.

Reference is now made to FIG. 4, which is a schematic view of a diagram 400 illustrating non-interactive certificate update protocol based on public key encryption.

The device 200 manufacturer generates the device initial public/private key pair (pk$_0$, sk$_0$) 201, 202 of signature scheme SIG for time T=0, chooses a random encryption/decryption key pair (ek$_c$, dk$_c$), and sets up these keys in the device 200.

At step 401, the first public keys (pk$_0$) 201 and eke are delivered, from the device 200 to the CA server 100 through secure communication channel.

At step 402, the CA server 100 generates the first digital certificate 101 and sends it to the device 200.

Moreover, during the certificate update phase, the following operations may be performed. The device 200 and the CA server 100 can carry out the update almost independently, given the first digital certificate (cert$_T$) 101 and the encryption key eke used previously at time T.

At step 403, the (new) update factor (u$_{T+1}$) 102 are chosen by the CA server 100 uniformly at random. The second public key (pk$_{T+1}$) 211 of the device 200 is calculated by adding the product of the multiplication (u$_T$*P) to the first public key (pk$_T$) 201 and the second digital certificate 111 is generated by the CA server 100 in the conventional way.

In addition, the CA server 100 generates a cipher-text by encrypting the calculated update factor 102 with the encryption key of the device 200, for example, the CA server 100 generates a cipher-text C$_{c,T+1}$ by encrypting u$_{T+1}$ with the encryption key eke of device 200.

At step 404, the CA server 100 sends the second digital certificate 111 and the cipher-text to the device 200.

At step 405, the device 200 receives, from the CA server 100, the cipher-text, and calculates the update factor 102, for example, by decrypting the cipher-text (C$_{c,T+1}$) with a decryption key (dk$_c$) of the device 200 and obtains the update factor (u$_{T+1}$) 102.

The device 200 calculates the second private key (sk$_{T+1}$) 212 based on adding the calculated update factor (u$_{T+1}$) 102 to the first private key (sk$_T$) 202.

Figure 5:
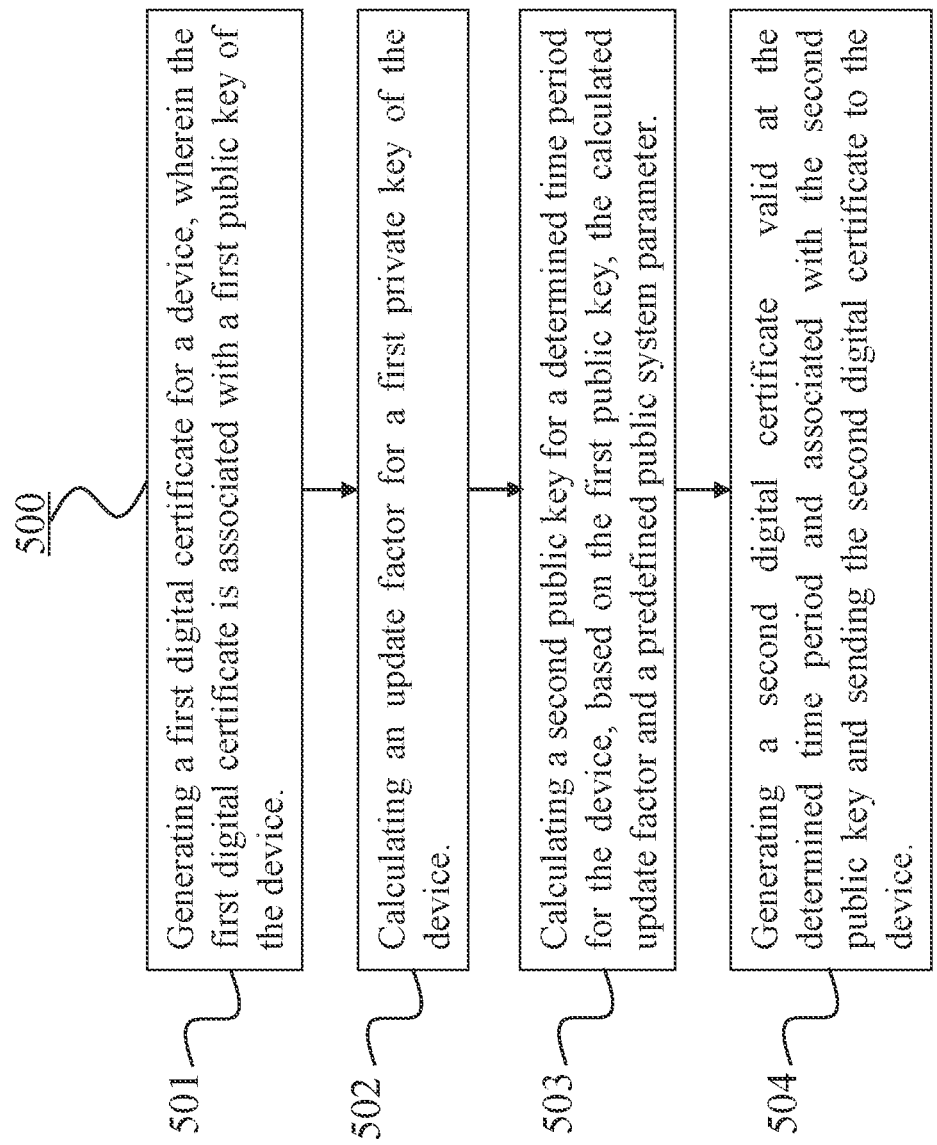
FIG. 5 is a flowchart of a method for issuing a digital certificate, according to an embodiment of the present disclosure.

FIG. 5 shows a method 500 according to an embodiment of the disclosure for issuing a digital certificate. The method 500 may be carried out by the CA server 100, as it is described above.

The method 500 comprises a step 501 of generating a first digital certificate 101 for a device 200, wherein the first digital certificate 101 is associated with a first public key of the device 201.

The method 500 further comprises a step 502 of calculating an update factor 102 for a first private key 202 of the device 200.

The method 500 further comprises a step 503 of calculating a second public key 211 for a determined time period for the device 200, based on the first public key 201, the calculated update factor 102 and a predefined public system parameter 103.

The method 500 further comprises a step 504 of generating a second digital certificate 111 valid at the determined time period and associated with the second public key 211 and send the second digital certificate 111 to the device 200.

Figure 6:
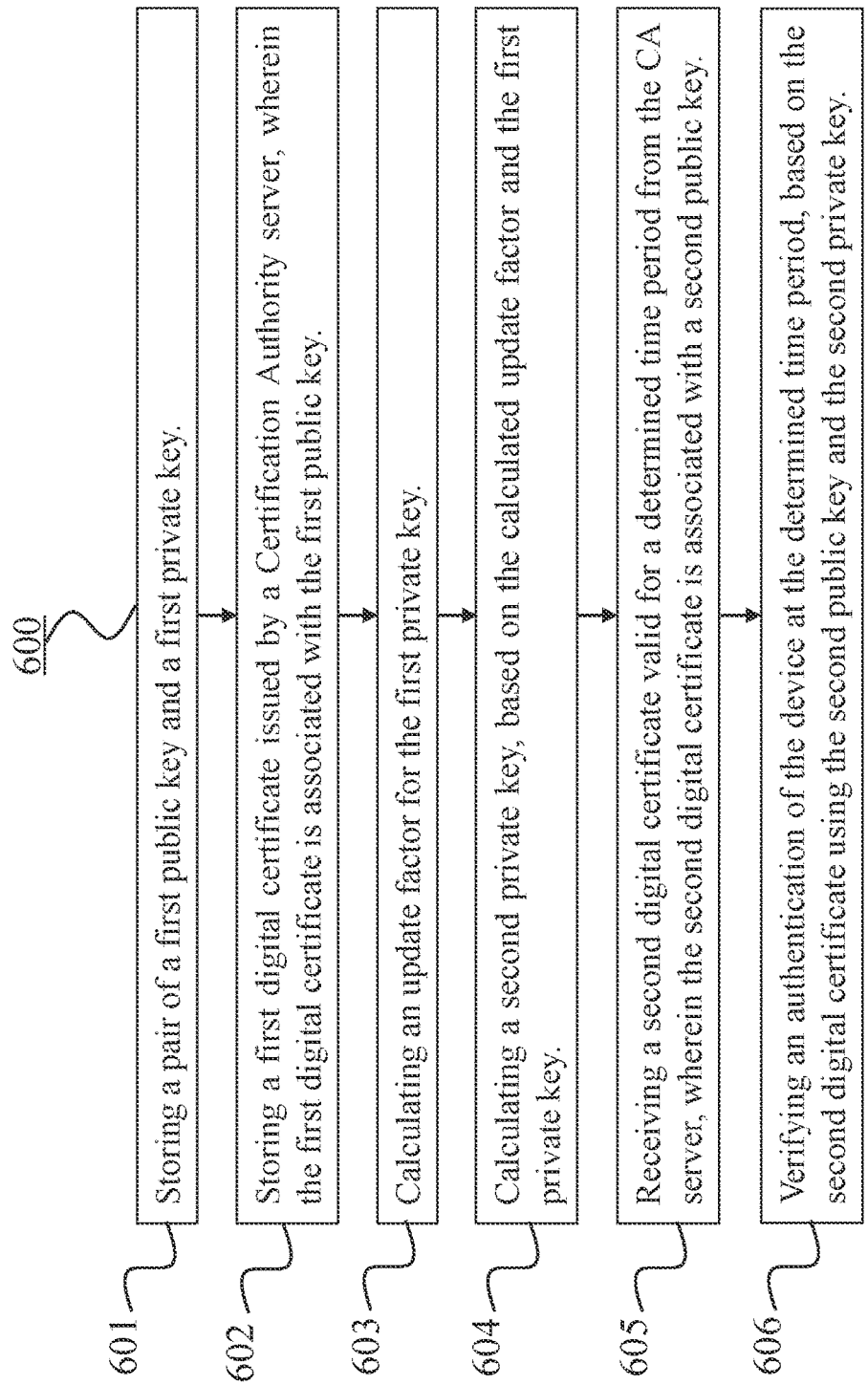
FIG. 6 is a flowchart of a method including verifying an authentication of a device, according to an embodiment of the disclosure.

FIG. 6 shows a method 600 including verifying an authentication of a device 200, according to an embodiment. The method 600 may be carried out by the device 200, as it is described above.

The method 600 comprises a step 601 of storing a pair of a first public key 201 and a first private key 202.

The method 600 further comprises a step 602 of storing 602 a first digital certificate 101 issued by a Certification Authority (CA) server 100, wherein the first digital certificate 101 is associated with the first public key 201.

The method 600 further comprises a step 603 of calculating an update factor 102 for the first private key 202.

The method 600 further comprises a step 604 of calculating 604 a second private key 212, based on the calculated update factor 102 and the first private key 202.

The method 600 further comprises a step 605 of receiving a second digital certificate 111 from the CA server 100, wherein the second digital certificate 111 is associated with a second public key 211.

The method 600 further comprises a step 606 of verifying an authentication of the device 200 based on the second digital certificate 111 using the second public key 211 and the second private key 212.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A Certification Authority (CA) server for issuing digital certificates, the CA server comprising:
   one or more processors; and
   a computer memory communicatively coupled to the one or more processors and having executable program code stored thereon, wherein the one or more processors are configured to:
      generate a first digital certificate for a device, wherein the first digital certificate is associated with a first public key of the device,
      calculate an update factor for a first private key of the device,
      calculate a second public key for a determined time period for the device, based on the first public key, the calculated update factor and a predefined public system parameter, and
      generate a second digital certificate-valid at the determined time period and associated with the second public key and send the second digital certificate to the device.

2. The CA server according to claim 1, wherein the one or more processors are further configured to:
   receive, from the device, via a secure communication channel, one or more of:
   an identifier, ID, of the device,
   the first public key of the device,
   a first Pseudo Random Function (PRF) key, or
   an encryption key of the device.

3. The CA server according to claim 2, wherein the one or more processors are further configured to:
   calculate a second PRF key and calculate the update factor, based on calling a PRF on the first PRF key.

4. The CA server according to claim 2, wherein:
   the update factor is calculated based on a random number, and wherein the one or more processors are further configured to:
   generate a cipher-text by encrypting the calculated update factor with the encryption key of the device, and
   send the cipher-text to the device.

5. The CA server according to claim 1, wherein:
   the second public key is calculated based on multiplying the update factor by the predefined public system parameter indicating a point of an elliptic curve cryptography, and adding the product of the multiplication to the first public key.

6. The CA server according to claim 1, wherein:
   the CA server is configured for authentication via Public Key Infrastructure (PKI) with public key cryptography.

7. A method for a Certification Authority (CA) server for issuing digital certificates, the method comprising:
   generating a first digital certificate for a device, wherein the first digital certificate is associated with a first public key of the device,
   calculating an update factor for a first private key of the device,
   calculating a second public key for a determined time period for the device, based on the first public key, the calculated update factor, and a predefined public system parameter, and
   generating a second digital certificate valid at the determined time period and associated with the second public key and send the second digital certificate to the device.

8. A device comprising:
   one or more processors; and
   a computer memory communicatively coupled to the one or more processors and having executable program code stored thereon, wherein the one or more processors are configured to:
      store a pair of a first public key and a first private key,
      store a first digital certificate issued by a Certification Authority (CA) server, wherein the first digital certificate is associated with the first public key,
      calculate an update factor for the first private key,
      calculate a second private key based on the calculated update factor and the first private key,
      receive a second digital certificate from the CA server, wherein the second digital certificate is associated with a second public key, and
      verify an authentication of the device based on the second digital certificate using the second public key and the second private key.

9. The device according to claim 8, wherein the one or more processors are further configured to:
   send, to the CA server, via a secure communication channel, one or more of:
   an identifier (ID) of the device,
   the first public key of the device,
   a first Pseudo Random Function (PRF) key, or
   an encryption key of the device.

10. The device according to claim 9, wherein the one or more processors are further configured to:
    calculate a second PRF key and calculate the update factor, based on calling a PRF on the first PRF key.

11. The device according to claim 9, wherein the one or more processors are further configured to:
    receive, from the CA server, a cipher-text, and
    calculate the update factor-by decrypting the cipher-text with a decryption key of the device.

12. The device according to claim 8, wherein:
    the second private key is calculated based on adding the calculated update factor to the first private key.

13. The device according to claim 8, wherein the device is a node in Internet of Things (IoT).

14. A non-transitory computer-readable medium having a program code stored thereon, the program code, when executed by a computer processor, causes the method of claim 7 to be performed.

* * * * *